United States Patent
Lyon et al.

(10) Patent No.: US 7,799,474 B2
(45) Date of Patent: Sep. 21, 2010

(54) SYSTEM AND METHOD FOR MANAGING ELECTRICALLY ISOLATED FUEL CELL POWERED DEVICES WITHIN AN EQUIPMENT RACK

(75) Inventors: Geoff M. Lyon, Menlo Park, CA (US); Cyril Brignone, Mignaloux (FR); Salil Pradhan, Santa Clara, CA (US); Ratnesh Sharma, Union City, CA (US); Malena Mesarina, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1783 days.

(21) Appl. No.: 10/425,763

(22) Filed: Apr. 29, 2003

(65) Prior Publication Data
US 2004/0219405 A1 Nov. 4, 2004

(51) Int. Cl.
*H01M 8/04* (2006.01)
*H01M 2/38* (2006.01)
*H01M 2/40* (2006.01)
*H01M 8/24* (2006.01)

(52) U.S. Cl. ............ 429/428; 429/430; 429/432; 429/456

(58) Field of Classification Search ............ 429/12, 429/34, 39
See application file for complete search history.

(56) References Cited

U.S. PATENT DOCUMENTS

| | | | |
|---|---|---|---|
| 4,517,670 A | 5/1985 | Ulug | |
| 6,071,385 A * | 6/2000 | Long | 204/222 |
| 6,420,059 B1 | 7/2002 | Surampudi et al. | |
| 6,468,682 B1 | 10/2002 | Fuglevand et al. | |
| 6,569,555 B1 | 5/2003 | Faris et al. | |
| 6,743,536 B2 * | 6/2004 | Fuglevand | 429/9 |
| 6,773,839 B2 * | 8/2004 | Fuglevand et al. | 429/22 |
| 6,798,660 B2 | 9/2004 | Moss et al. | |
| 2002/0193978 A1 | 12/2002 | Soudier | |
| 2003/0035985 A1* | 2/2003 | Colborn | 429/24 |
| 2003/0070850 A1 | 4/2003 | Reid et al. | |
| 2004/0028961 A1 | 2/2004 | Acker | |
| 2004/0043274 A1 | 3/2004 | Scartozzi et al. | |
| 2004/0053090 A1 | 3/2004 | Hanson et al. | |
| 2004/0053093 A1* | 3/2004 | Colborn et al. | 429/23 |
| 2004/0164702 A1 | 8/2004 | Holmes | |

(Continued)

OTHER PUBLICATIONS

Webpage of Lytron, www.lytron.com, p. 1 (2002).

(Continued)

*Primary Examiner*—Patrick Ryan
*Assistant Examiner*—Julian Mercado

(57) ABSTRACT

A system and method for managing electrically isolated fuel cell powered devices within an equipment rack is disclosed. The system discloses: an equipment rack; fuel cell devices; a fluid bus; a fluid manifold, coupling the fluid bus to each of the fuel cell devices; and an external fuel cell manager, for controlling a flow of fuel cell fluids to each of the fuel cell devices. The method discloses: generating electrical power on an electrical bus internal to each of a set of fuel cell devices, which are located in an equipment rack having an external electrical bus; transporting fuel cell fluids from a fluid bus to the fuel cell devices through a fluid manifold; adjusting the electrical power generated by each of the fuel cell devices; and electrically isolating the internal electrical bus of each of the fuel cell devices from the external electrical bus.

19 Claims, 8 Drawing Sheets

U.S. PATENT DOCUMENTS

2004/0219397 A1 11/2004 Lyon et al.
2004/0219405 A1 11/2004 Lyon et al.
2004/0219415 A1 11/2004 Brignone et al.
2004/0265662 A1 12/2004 Brignone et al.
2005/0128689 A1 6/2005 Caci et al.

OTHER PUBLICATIONS

Webpage of PSK Climate control solutions, www.enclosureinfo.com/tech/tittal/over/v1_17209000_01, pp. 1-3 (2003).
Webpage of H2FC investor's Weekly Newsletter, www.h2fc.com/1apps.html, pp. 1-4(2003).

* cited by examiner

SYSTEM AND METHOD FOR MANAGING ELECTRICALLY ISOLATED FUEL CELL POWERED DEVICES WITHIN AN EQUIPMENT RACK

BACKGROUND OF THE INVENTION

1. Field of the Invention

The present invention relates generally to systems and methods for managing fuel cell devices, and more particularly to managing electrically isolated fuel cell powered devices within an equipment rack.

2. Discussion of Background Art

Modern service and utility based computing is increasingly driving enterprises toward consolidating large numbers of electrical servers, such as blade servers, and their supporting devices into massive data centers. A data center is generally defined as a room, or in some cases, an entire building or buildings, that houses numerous printed circuit (PC) board electronic systems arranged in a number of racks. Such centers, of perhaps fifty-thousand nodes or more, require that such servers be efficiently networked, powered, and cooled.

Typically such equipment is physically located within a large number of racks. Multiple racks are arranged into a row. The standard rack may be defined according to dimensions set by the Electronics Industry Association (EIA) for an enclosure: 78 in. (2 meters) wide, 24 in. (0.61 meter) wide and 30 in. (0.76 meter) deep.

Standard racks can be configured to house a number of PC boards, ranging from about forty (40) boards, with future configuration of racks being designed to accommodate up to eighty (80) boards. Within these racks are also network cables and power cables. FIGS. 1A through 1D each show an example of what such equipment racks can look like. FIG. 1A is a pictorial diagram of electrical cabling within a first equipment rack. FIG. 1B is a pictorial diagram of electrical cabling within a second equipment rack. FIG. 1C is a pictorial diagram of electrical cabling within a third equipment rack. And, FIG. 1D is a pictorial diagram of electrical cabling within a fourth equipment rack.

The PC boards typically include a number of components, e.g., processors, micro-controllers, high-speed video cards, memories, and semi-conductor devices, that dissipate relatively significant amounts of heat during the operation. For example, a typical PC board with multiple microprocessors may dissipate as much as 250 W of power. Consequently, a rack containing 40 PC boards of this type may dissipate approximately 10 KW of power.

Generally, the power used to remove heat generated by the components on each PC board is equal to about 10 percent of the power used for their operation. However, the power required to remove the heat dissipated by the same components configured into a multiple racks in a data center is generally greater and can be equal to about 50 percent of the power used for their operation. The difference in required power for dissipating the various heat loads between racks and data centers can be attributed to the additional thermodynamic work needed in the data center to cool the air. For example, racks typically use fans to move cooling air across the heat dissipating components for cooling. Data centers in turn often implement reverse power cycles to cool heated return air from the racks. This additional work associated with moving the cooling air through the data center and cooling equipment, consumes large amounts of energy and makes cooling large data centers difficult.

In practice, conventional data centers are cooled using one or more Computer Room Air Conditioning units, or CRACs. The typical compressor unit in the CRAC is powered using a minimum of about thirty (30) percent of the power required to sufficiently cool the data centers. The other components, e.g., condensers, air movers (fans), etc., typically require an additional twenty (20) percent of the required cooling capacity.

As an example, a high density data center with 100 racks, each rack having a maximum power dissipation of 10 KW, generally requires 1 MW of cooling capacity. Consequently, air conditioning units having the capacity to remove 1 MW of heat generally require a minimum of 300 KW to drive the input compressor power and additional power to drive the air moving devices (e.g., fans and blowers).

Quite clear from these Figures, technicians, who install and service these cable intensive racks, are presented with a substantial amount of work each time such electrical servers are installed, removed, or serviced. With such wiring complexity, not only do such tasks require a significant amount of time, to wade through all of the wires and cables, but there is also a substantial chance that errors will be made during reinstallation, especially if more than one server unit is serviced at a time. Such excessive cabling also impedes equipment inspection and substantially impedes the flow of cooling air within the equipment rack, leading to device hot-spots and thus premature equipment failure.

Another problem with conventional systems is that each equipment rack's power needs can vary substantially, depending upon: how many servers or other devices are located in the rack; whether such devices are in a standby mode or are being fully utilized; and the variations in rack cabling losses. While central high-voltage/current power sources located elsewhere in the data center can provide the necessary power, the aforementioned power consumptions variations often result in greater overall data center transmission line losses, and more power-line transients and spikes, especially as various rack equipment goes on-line and off-line. Due to such concerns, power-line conditioning and switching equipment is typically added to each rack, resulting in even greater losses and heat generation.

Reliance on central power systems also subjects the racks to data center wide power failure conditions, which can result in disruptions in service and loss of data. While some equipment racks may have a battery backup, such batteries are designed to preserve data and permit graceful server shutdown upon experiencing a power loss. The batteries are not designed or sized for permitting equipment within the rack to continue operating at full power though.

Each equipment rack's cooling needs can also vary substantially depending upon how many servers or other devices are located in the rack, and whether such devices are in a standby mode, or being fully utilized. Central air conditioning units located elsewhere in the data center provide the necessary cooling air, however, due to the physical processes of ducting the cooling air throughout the data center, a significant amount of energy is wasted just transmitting the cooling air from the central location to the equipment in the racks. Cabling and wires internal to the rack and under the data center floors blocks much of the cooling air, resulting in various hot-spots that can lead to premature equipment failure.

One way of reducing energy wasted by ducting cooling air from a central source to equipment within the racks is to directly cool various rack components using liquid cooling. Such systems include surrounding equipment with liquid cooled "cold-plates." Such cold-plates may alternatively be mounted inside the equipment proximate to specific heat generating components. However, while such liquid cooling systems provide greater control and targeting of coolant to where it is needed most, such liquid systems also create a safety and reliability problem when interspersed with a rack's electrical cabling. Accidental spills, condensation, and/or leaky connections can easily damage or short-out various electrical equipment within the rack, resulting not only in degradation of the data center's level of service, but also a potentially very expensive repair bill.

In response to the concerns discussed above, what is needed is a system and method for managing fuel cell devices that overcomes the problems of the prior art.

SUMMARY OF THE INVENTION

The present invention is a system and method for managing electrically isolated fuel cell powered devices within an equipment rack. The system of the present invention includes: an equipment rack; a set of fuel cell devices, located within the rack, each having an internal fuel cell power source; a fluid bus, located external to the rack, for transporting fuel cell fluids to the rack; a fluid manifold, located within the rack, coupling the fluid bus to each of the fuel cell devices; and an external fuel cell manager, coupled to the manifold, for controlling a flow of fuel cell fluids through the manifold to each of the fuel cell devices.

The method of the present invention includes: generating electrical power on an electrical bus internal to each of a set of fuel cell devices, which are located in an equipment rack having an external electrical bus; transporting fuel cell fluids from a fluid bus to the fuel cell devices through a fluid manifold located in the equipment rack; adjusting the electrical power generated by each of the fuel cell devices, by individually regulating a flow of the fuel cell fluids through the fluid manifold to each of the fuel cell devices; and electrically isolating the internal electrical bus of each of the fuel cell devices from the external electrical bus.

These and other aspects of the invention will be recognized by those skilled in the art upon review of the detailed description, drawings, and claims set forth below.

DETAILED DESCRIPTION OF THE PREFERRED EMBODIMENT

The present invention in one embodiment uses fuel cell technology to reduce or eliminate reliance on a central power source by instantiating a fuel cell within servers and/or other devices. The present invention significantly reduces or eliminates intra-rack and inter-rack power cabling, thereby permitting the rack to be more efficiently cooled, more easily serviced, and avoiding the problem of mixing rack fluids with rack electrical cabling. Fuel cell liquids, such as methanol, can also be used to help cool the servers and devices directly. All of these capabilities make the present invention particularly advantageous over the prior art.

Figure 1A:
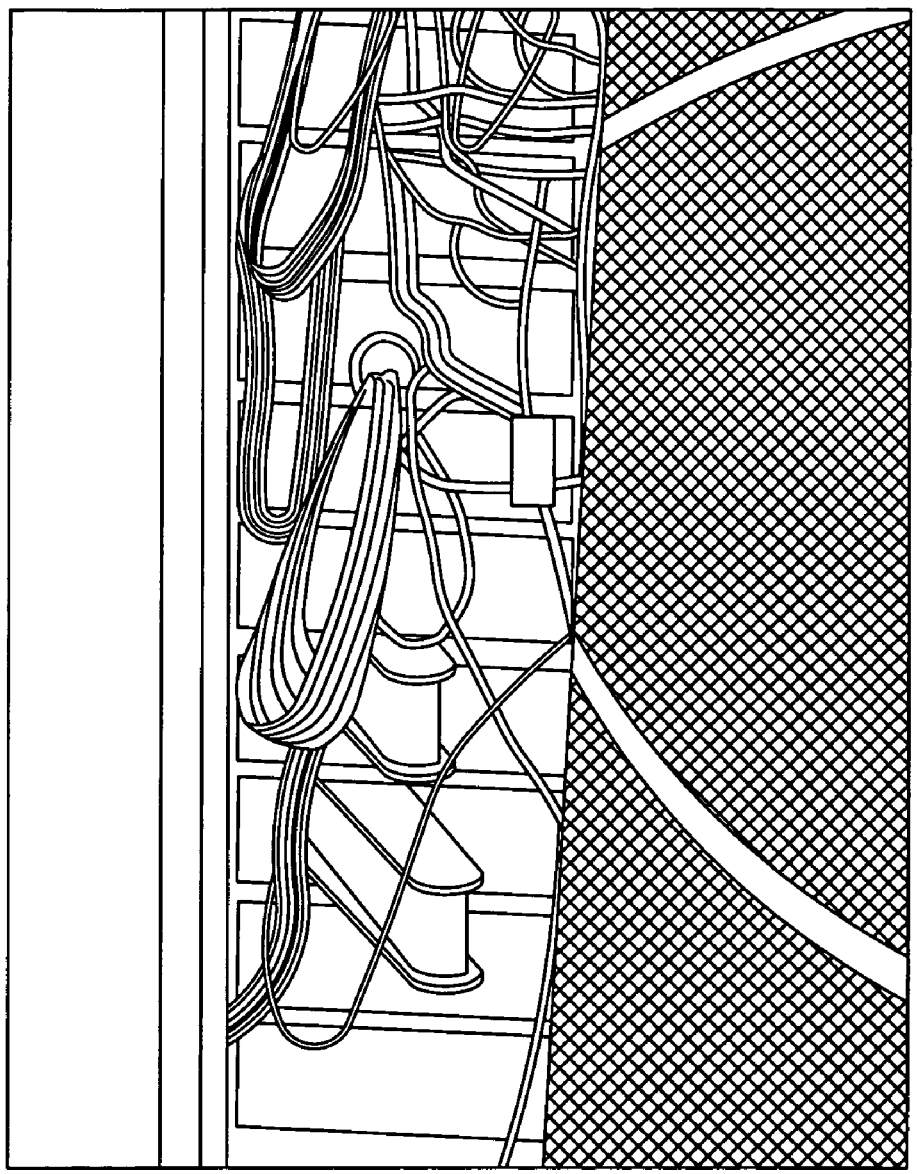
FIG. 1A is a pictorial diagram of electrical cabling within a first equipment rack.
Figure 1B:
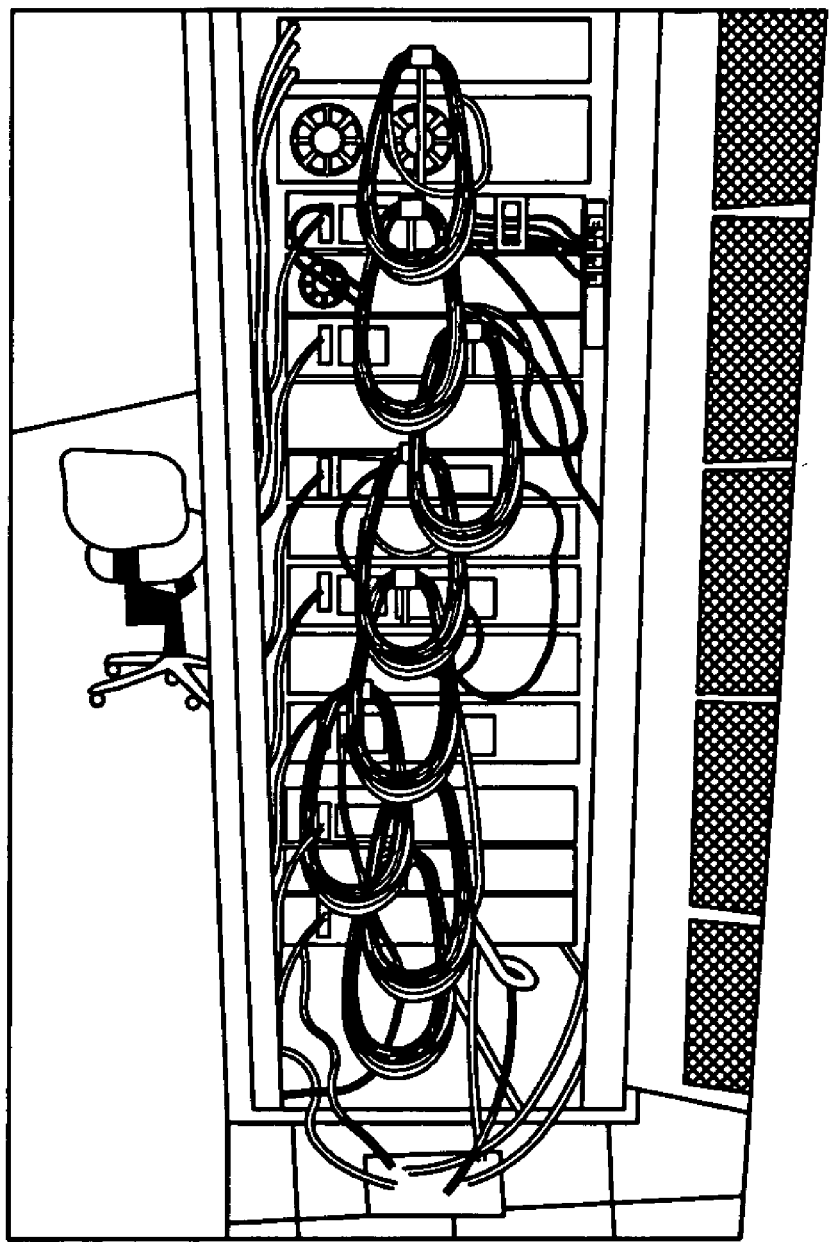
FIG. 1B is a pictorial diagram of electrical cabling within a second equipment rack.
Figure 1C:
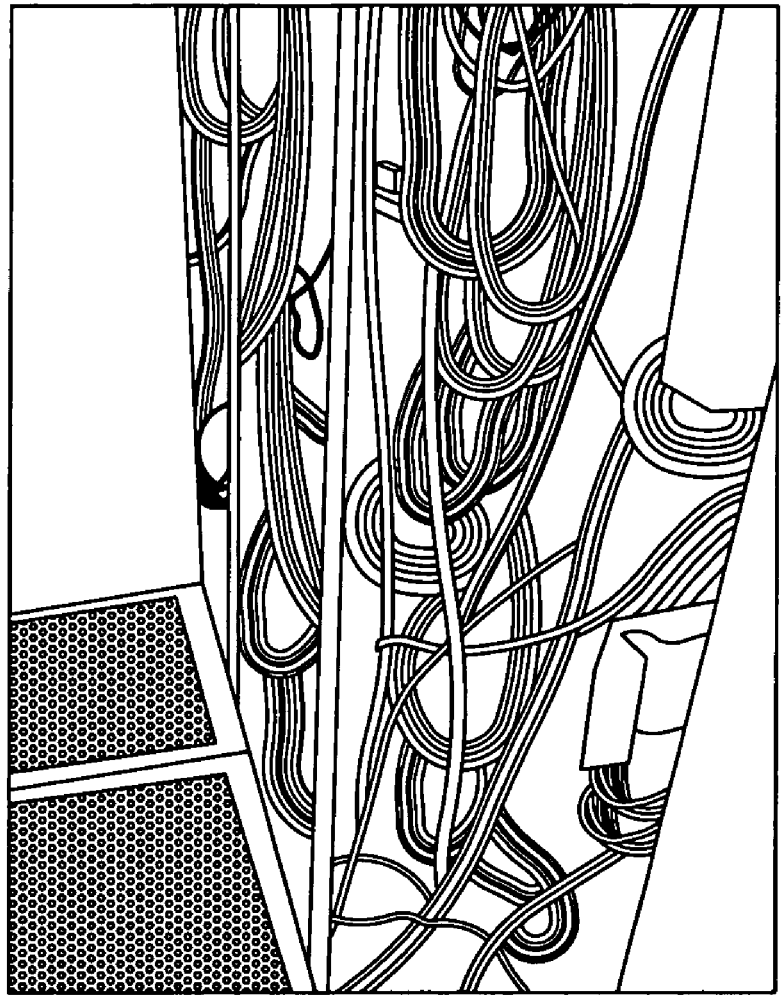
FIG. 1C is a pictorial diagram of electrical cabling within a third equipment rack.
Figure 1D:
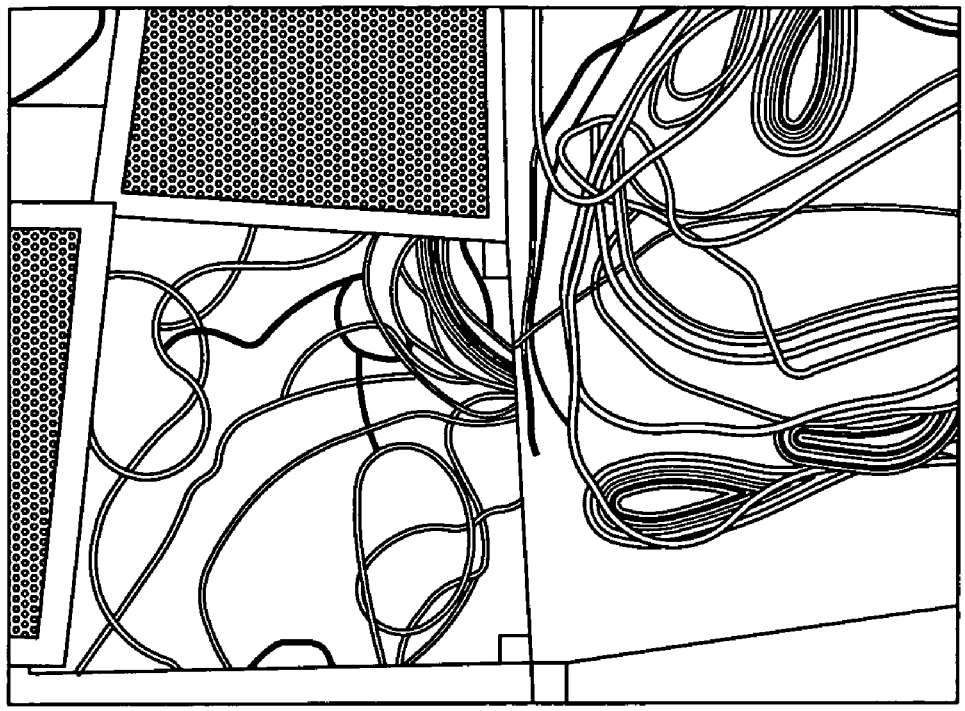
FIG. 1D is a pictorial diagram of electrical cabling within a fourth equipment rack.
Figure 2:
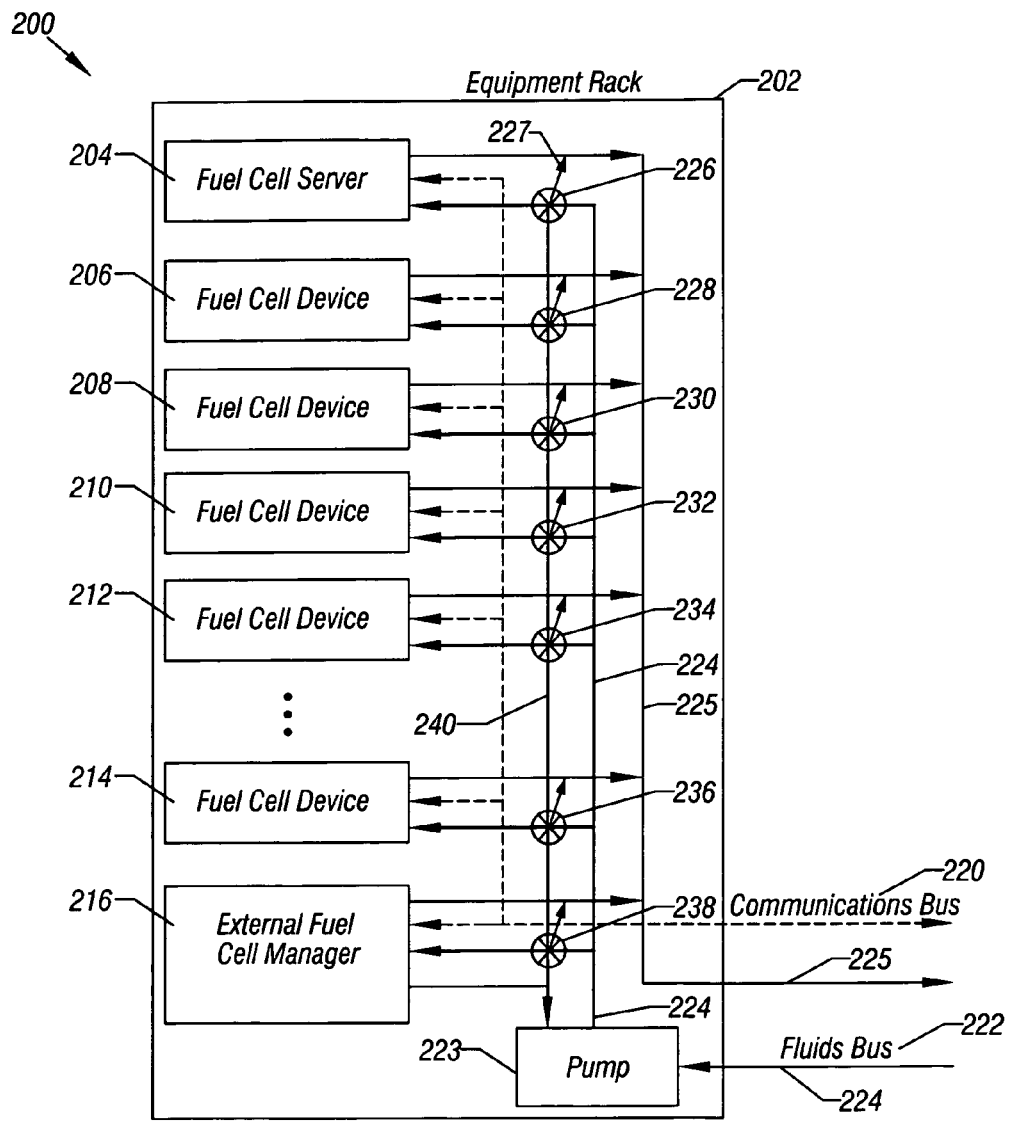
FIG. 2 is a block diagram of one embodiment of a system for managing electrically isolated fuel cell powered devices within an equipment rack.
Figure 3:
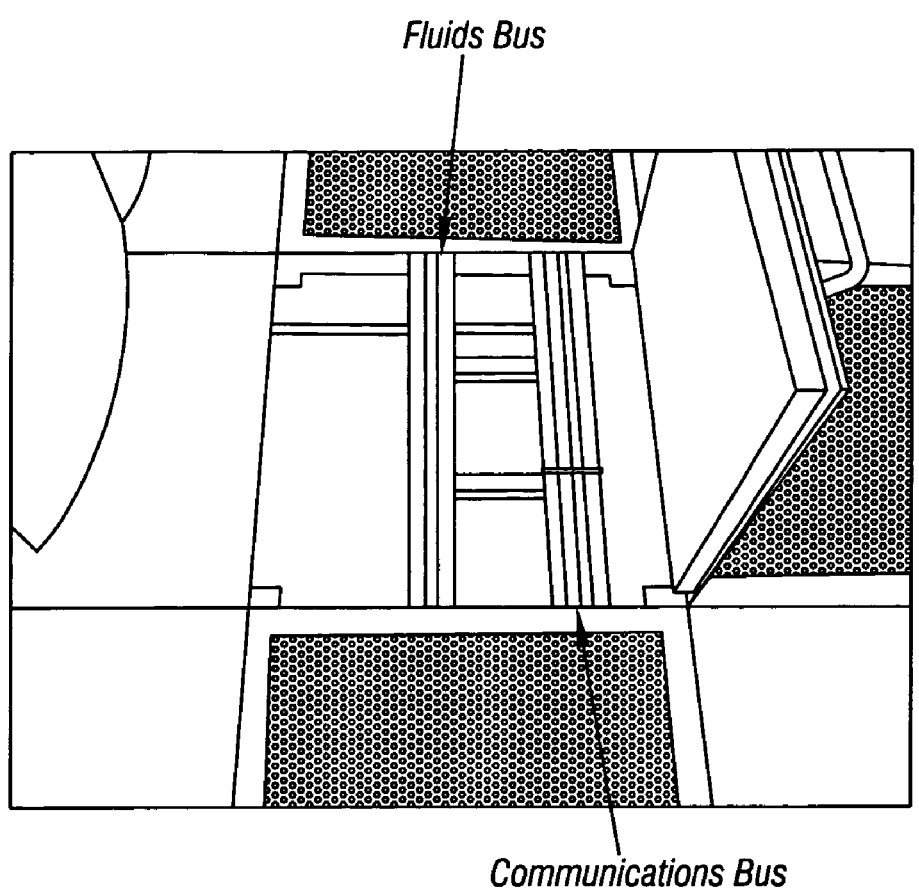
FIG. 3 is a flowchart of one embodiment of a method for managing electrically isolated fuel cell powered devices within an equipment rack.
Figure 4A:
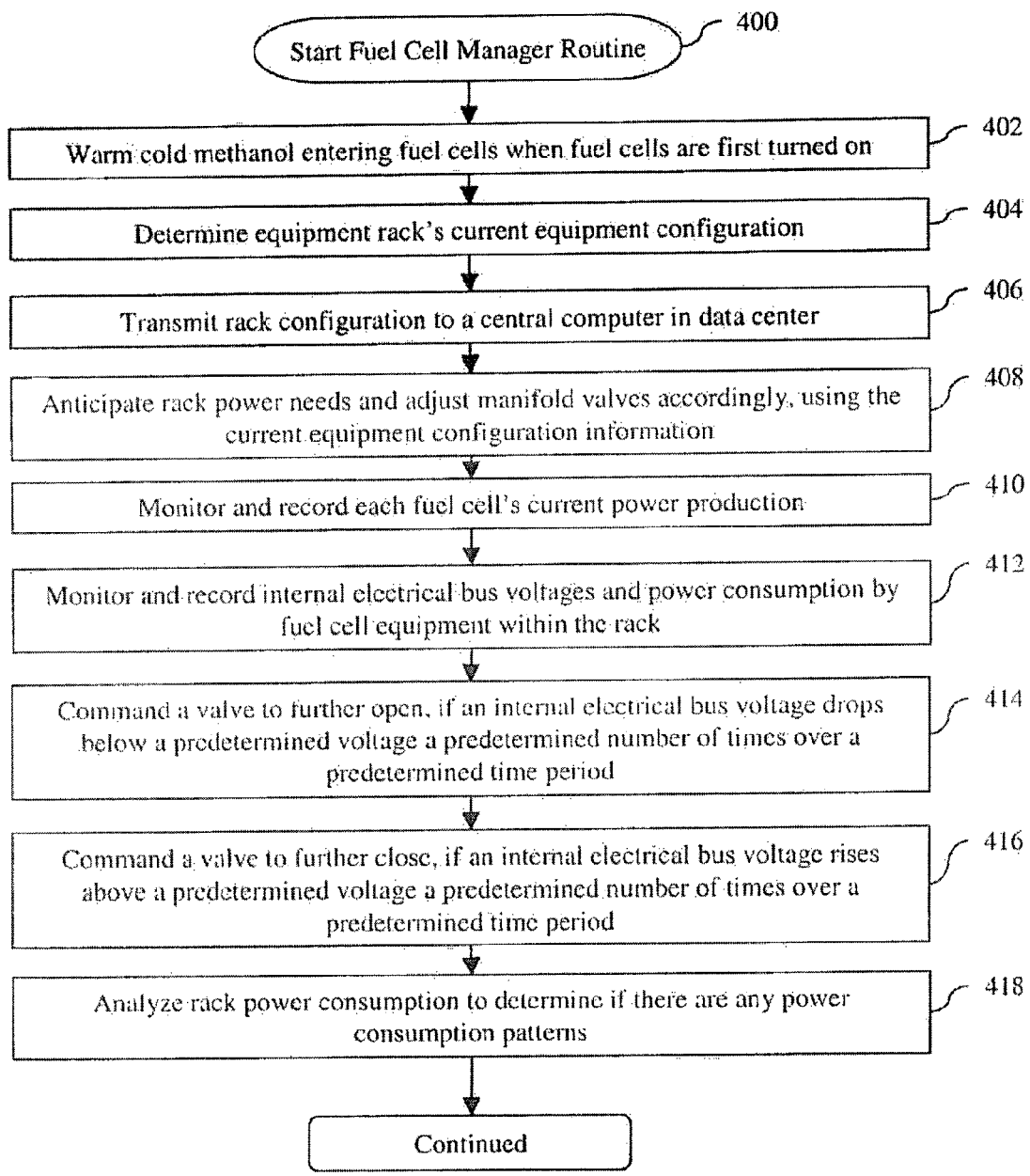
FIGS. 4A-4B depict one embodiment for routing a fluid and communications bus within the system.
Figure 4B:
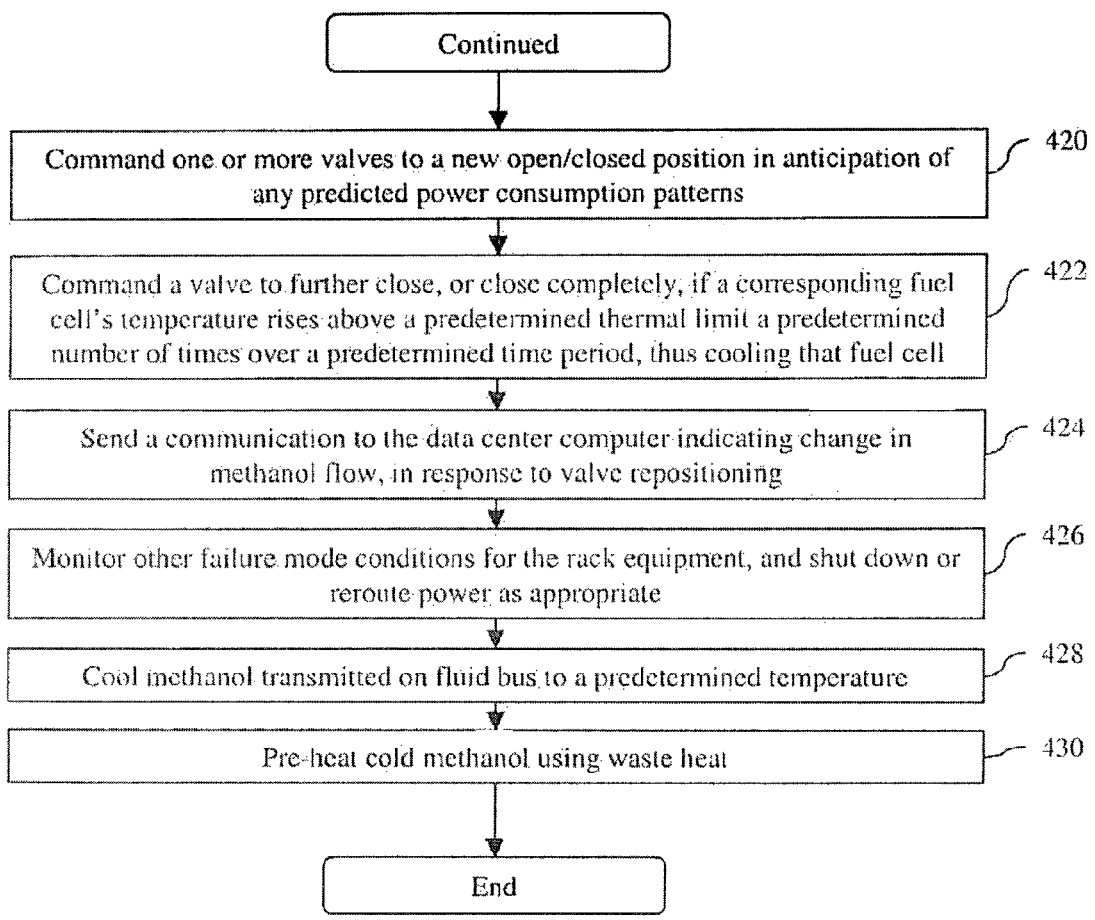

FIG. 2 is a block diagram of one embodiment of a system 200 for managing electrically isolated fuel cell powered devices within an equipment rack 202. FIG. 3 is a pictorial diagram of one embodiment for routing a communications bus and a fluid bus, within the system 200. FIGS. 4A-4B depict a flowchart of one embodiment of a method 400 for managing electrically isolated fuel cell powered devices within the equipment rack 202. The system 200, method 400, shown in FIGS. 2, 3, and 4, are herein described together in just one of many possible embodiments.

The equipment rack 202 refers generally to any structure able to hold a variety of equipment. More narrowly, the equipment rack 202 could be termed a device rack, and even more so, a server rack.

The equipment rack 202, in the one embodiment discussed herein, is presumed to be located within a data center (not shown) of a predetermined size. The data center includes a variety of centralized resources, and stores, which are discussed below as needed. Those skilled in the art however will know that the rack 202 could alternatively be located in a variety of other environments.

The rack 202 in the one embodiment of the present invention, shown in FIG. 2, includes a fuel cell server 204, a set of fuel cell devices 206 through 214, and an external fuel cell manager 216. Those skilled in the art will recognize that the number of servers and other devices in the rack may be varied depending upon how the present invention is implemented.

The fuel cell server 204, the set of fuel cell devices 206 through 214, and the external fuel cell manager 216 each preferably are powered by and include an internal fuel cell, an internal battery, and an internal electrical bus. These fuel cells are preferably Direct Methanol Fuel Cells (DMFCs), although those skilled in the art recognize other fuel cells which may work as well. The fuel cells each include a hydrogen circuit and an oxidizer circuit separated by a semi-permeable catalytic membrane. It is the interaction between the hydrogen and the oxidizer across the membrane which produces current flow and thus electrical power from the fuel cells. On the hydrogen circuit side of the membrane, a mixture of methanol and water enter into each fuel cell, while a mixture of methanol, water, and carbon dioxide exit. On the oxidizer circuit side of the membrane, an oxidizer, such as oxygen enters the fuel cells, while a mixture of oxygen, water, and nitrogen exit. The gasses exiting the oxidizer circuit are typically vented to the air, while the water is mixed back in with the water and methanol exiting the hydrogen circuit side of the membrane. Thus the fuel cells typically require at least two fluid ports, an input port for receiving the incoming methanol/water mixture and an output port for exhausting the outgoing methanol, carbon dioxide, and water mixture. During normal operation, the incoming fluid mixture is preferably very cold so that the methanol can be used to cool equipment within the rack 202. However, an added benefit of cold methanol is that the methanol's volatility is reduced.

Preferably the internal electrical bus within the server, devices and manager is not connected to an external electrical bus within the rack 202. Instead, the server, devices and manager's only external connections are to a fluids bus 222 and the communications bus 220. By eliminating such an electrical backplane within the rack, not only is cabling within the rack 202 significantly reduced, but the problem of fluid and electrical interaction is removed, thereby improving safety and reliability. Alternate embodiments of the present invention however may include an electrical bus. In order to further simplify construction and maintenance of the present invention, it is further preferred that the rack 202 not even have such an external electrical bus.

A communications bus 220 routes data between the fuel cell server 204, devices 206 through 214, and external fuel cell manager 216, as well as between the rack 202 and the rest of the data center. Preferably the communications bus 220 is a fiber optic cable, and thus is not affected by any fluid leaks from the fuel cells. However, the communications bus 220 could also be of another type.

The fluids bus 222, external to the rack 202, routes incoming and outgoing fluids to the rack 202 from the data center's centralized fluid stores and repositories. The fluids bus 222 connects to a fluid manifold, which is internal to the rack 202. Since the fuel cells as discussed herein are preferably methanol based fuel cells, the manifold preferably includes a methanol input conduit 224, a pump 223, a methanol output conduit 225, and a set of valves 226 through 238. Those skilled in the art will recognize that other embodiments of the present invention may use different fuel cell technology, which require a different, but functionally equivalent, manifold. The input conduit 224 routes methanol to input ports on the fuel cells and the output conduit 225 routes methanol from output ports on the fuel cells, the ports and conduit 224 and 225 are coupled using leak-resistant no-drip connectors. The pump 223 is used to maintain fluid pressure within the inlet conduit 224 as fuel cell fluid needs vary. In an alternate embodiment a bypass control valve can be substituted for the pump. The bypass control valve would be located at the same place as the pump but would continually bypass a predetermined amount of fluid from the input conduit to the output conduit in order to maintain a prescribed pressure an the input ports of the each of the fuel cells.

FIG. 3 is a pictorial diagram of one embodiment for routing the communications bus 220 and the fluid bus 222 underneath the floors of the data center and shows their simplicity compared to the electrical cabling discussed in the background section of this specification.

The valves 226 through 238 are coupled to the external fuel cell manager 216 via control lines 240 and in response to commands from the manager 216 control fluid flow from the inlet conduit 224 to the fuel cell server 204, fuel cell devices 206 through 214, and the external fuel cell manager 216 itself. The valves are preferably three-way valves each having an inlet port, an outlet port, and a bypass port. The inlet port of each valve receives incoming fluids from the input conduit 224. The outlet port of each valve connects to each of the fuel cell inlet ports. The bypass ports of the valves connect to the output conduit 225 via bypass paths, such as bypass path 227 for valve 226.

The valves can preferably be adjusted continuously from a fully-open and to a fully-closed position. When a valve is fully-open, all incoming fluids are routed to a fuel cell input port. However, when a valve is fully-closed, all incoming fluids bypass the fuel cell and are routed to the outlet conduit 225.

Since, the fuel cells need methanol in order to produce electricity, the more methanol available to the fuel cells, the more electricity the fuel cells can produce, whereas, the less methanol made available to the fuel cells, the less electricity the fuel cells can produce. Thus, by varying the amount of methanol supplied to the fuel cells' input ports, the valve controls how much electricity the fuel cells can produce and thus the valves are functionally equivalent to conventional power switches. Unlike power switches, however, the valves 226 through 238 do not waste as much electricity and generate heat.

The external fuel cell manager 216 is preferably a computer operated device which manages the fuel cells and the fluid manifold valves 226 through 238, according to the method 400 of FIGS. 4A-4B. When the fuel cells are first turned on, the external fuel cell manager 216, in step 402, activates electrical heaters to warm the cold methanol entering each fuel cell's input port. Pre-heating the incoming methanol permits the fuel cells to reach their normal operating efficiency level more quickly. In order to keep all electrical connections isolated from rack 202 fluids, separate heaters are preferably located inside the server 204, each of the devices 206 through 214, and the manager 216. The heaters are powered by the respective internal batteries. Since the fuel cells themselves also generate heat during operation, such heat can be used to continue pre-heating the incoming methanol, so that the electrical heaters may be turned off.

In step 404, the external fuel cell manager 216 determines the rack's 202 current equipment configuration. The equipment configuration refers to a number of power consuming servers and other devices within the rack 202 and their individual power needs. The fuel cell manager 216 can obtain this information either by polling the server 204 and devices 206 through 214 over the communications bus 220, or by referring to a pre-loaded data table. The fuel cell manager 216 also calculates its own power consumption needs. In step 406, the external fuel cell manager 216 transmits the rack's 202 configuration to a central computer (not shown) in the data center which controls fluid bus 222 flow throughout the data center. In step 408, the external fuel cell manager 216 anticipates the rack's 202 power needs and adjusts the manifold valves 226 through 238 accordingly, using the current equipment configuration information.

In step 410, the fuel cell manager 216 monitors and records each fuel cell's current power production, using data transmitted by the server 204 and devices 206 through 214 over the communications bus 220. In step 412, the fuel cell manager 216 monitors and records internal electrical bus voltages and power consumption for the server 204 and devices 206 through 214 within the equipment rack 202, also using data transmitted by the server 204 and devices 206 through 214 over the communications bus 220. If an internal electrical bus voltage, for a server or one of the devices, drops below a predetermined voltage a predetermined number of times over a predetermined time period, the fuel cell manager 216, in step 414, commands the valve, corresponding to that server or device, to further open, thus permitting more methanol to flow to the fuel cells. If an internal electrical bus voltage, for a server or one of the devices, rises above a predetermined voltage a predetermined number of times over a predetermined time period, the fuel cell manager 216, in step 416, commands the valve, corresponding to that server or device, to further close, thus restricting methanol flow to the fuel cells. Preferably the internal electrical bus voltage is monitored at or near the battery within the server 202 connected between the server's 202 fuel cell and the internal electrical bus. The battery is needed since the server's 202 fuel cell's output voltage is not easy to directly regulate.

In step 418, rack power consumption is analyzed by the fuel cell manager 216 to determine if there are any relatively predictable power consumption patterns. In step 420, the fuel cell manager 216 commands one or more of the valve 226 through 238 to a new open/closed position in anticipation of the predicted power consumption pattern. Power consumption anticipation is preferred since fuel cells do not instantaneously vary their power output with changes in methanol flow.

Also, if the temperature, for a server or one of the devices, rises above a predetermined thermal limit a predetermined number of times over a predetermined time period, the fuel cell manager 216, in step 422, commands the valve, corresponding to that server or device, to further close, or close completely, thus cooling that server or device's fuel cell.

In step 424, the fuel cell manager 216 sends a communication to the data center computer indicating the change in methanol flow, in response to valve repositioning, so that the data center computer can maintain fluid bus 222 pressure. In step 426, the fuel cell manager 216, also monitors a variety of other failure mode conditions for the server 204 and other devices 206 through 214, and shuts down or reroutes fluids to such server or other devices as appropriate.

While, as mentioned above, any type of fuel cell can power the equipment rack 202, methanol fuel cells present certain further opportunities to cool the rack 202 as well. Methanol tends to be very volatile at room temperature, and can easily ignite or evaporate. Cooling the methanol, pumped to the rack 202, significantly reduces such volatility. However, methanol fuel cells also operate most efficiently when their incoming methanol stream is warmed/heated to a predetermined temperature. Such preferred engineering guides present an opportunity to both cool the equipment rack 202 and pre-heat the methanol for the fuel cells simultaneously. Thus in step 428, methanol transmitted on the fluid bus 222 is cooled to a predetermined temperature. Either as the methanol passes through the inlet conduit 224, or somewhere internal to the server 204 and devices 206 through 214 themselves, the cold methanol is pre-heated using waste heat, in step 430. Any pre-heating of the methanol preferably occurs after the methanol is used for cooling so that ability of the methanol to cool the rack equipment is maximized. Thus, within the present invention, power production and cooling are symbiotically combined, thereby further simplifying the rack's construction and ease of maintenance and operation.

While one or more embodiments of the present invention have been described, those skilled in the art will recognize that various modifications may be made. Variations upon and modifications to these embodiments are provided by the present invention, which is limited only by the following claims.

What is claimed is:

1. A system for controlling power, comprising:
    an equipment rack;
    a set of fuel cell devices, located within the rack, each having an internal fuel cell power source;
    a fluid manifold, located within the rack, to couple a fluid bus external to the rack to each of the fuel cell devices, wherein the fluid bus is for transporting fuel cell fluids; and
    an external fuel cell manager, located within the rack and coupled to the manifold, configured to monitor voltages of the fuel cell devices and configured to control the manifold to provide an additional flow of fuel to at least a particular one of the fuel cell devices in response to detecting that the voltage for the particular fuel cell device has dropped below a threshold.

2. The system of claim 1:
    wherein the rack includes an external electrical bus; and
    wherein each of the fuel cell devices includes an internal electrical bus, which is electrically isolated from the external electrical bus.

3. The system of claim 1:
    wherein at least one of the fuel cell devices includes an internal fuel cell manager, for transmitting requests to the external fuel cell manager to change the flow of fuel cell fluids to that fuel cell device.

4. The system of claim 1:
    wherein the equipment rack and fluid bus are located in a data center.

5. The system of claim 1
    wherein one of the fuel cell devices is a fuel cell server.

6. The system of claim 1:
    wherein the internal fuel power sources use methanol as fuel.

7. The system of claim 1:
    wherein each of the fuel cell devices includes an internal battery coupled to the corresponding internal fuel cell power source, for sourcing and sinking electrical power.

8. The system of claim 1:
    wherein the manifold includes a set of valves, for individually varying fuel cell fluids transported to each of the fuel cell devices, in response to commands from the external fuel cell manager.

9. The system of claim 8:
    wherein the valves are three-way valves, which cause the fuel cell fluids to bypass the fuel cell devices in response to commands from the external fuel cell manager.

10. The system of claim 1, further comprising:
    a communications bus, coupling the fuel cell devices to the external fuel cell manager, for transmitting data on electrical power generated and consumed by the fuel cell devices.

11. The system of claim 10:
    wherein the communications bus includes a fiber optic cable.

12. The system of claim 1, wherein the external fuel cell manager is configured to control the manifold to provide a first non-zero flow of fuel to the particular fuel cell device in response to the voltage of the particular fuel cell device being above the threshold, and configured to control the manifold to provide a second non-zero flow of fuel to the particular fuel cell device in response to the voltage of the particular fuel cell device being below the threshold, wherein the second non-zero flow of fuel is greater than the first non-zero flow of fuel by the additional flow of fuel.

13. The system of claim 1, wherein the fuel cell devices comprise power-consuming devices that are part of a data center, wherein at least one of the fuel cell devices comprises a server.

14. The system of claim 13, wherein the manifold comprises valves, and wherein the external fuel cell manager is configured to control the valve corresponding to the particular fuel cell device to provide the additional flow of fuel to the particular fuel cell device.

15. The system of claim 1, wherein the external fuel cell manager is configured to monitor power consumption by the fuel cell devices to predict a power consumption pattern, and wherein the external fuel cell manager is configured to control the manifold to control the flow of fluids to the fuel cell devices based on the power consumption pattern.

16. A system for controlling power, comprising:
    an equipment rack;
    a set of fuel cell devices, located within the rack, each having an internal fuel cell power source;
    a fluid bus, located external to the rack, for transporting fuel cell fluids to the rack;
    a fluid manifold, located within the rack, coupling the fluid bus to each of the fuel cell devices;

an external fuel cell manager, coupled to the manifold, configured to control a flow of fuel cell fluids through the manifold to each of the fuel cell devices;

wherein the rack includes an external electrical bus;

wherein each of the fuel cell devices include an internal electrical bus, which is electrically isolated from the external electrical bus; and wherein a particular one of the fuel cell devices include an internal fuel cell manager, configured to transmit requests to the external fuel cell manager to change the flow of fuel cell fluids to the particular fuel cell device.

17. The system of claim 16, wherein the external fuel cell manager is in the equipment rack, and wherein the external fuel cell manager is configured to monitor voltages of the fuel cell devices and configured to control the manifold to provide an additional flow of fuel to at least a particular one of the fuel cell devices in response to detecting that the voltage of the particular fuel cell device has dropped below a threshold.

18. The system of claim 17, wherein the additional flow of fuel is in addition to a non-zero flow of fuel to the particular fuel cell device prior to the voltage of the particular fuel cell device dropping below the threshold.

19. A system for controlling power, comprising:

means for generating electrical power on a power bus internal to each of a set of fuel cell devices, which are located in an equipment rack having an external power bus;

means for transporting fuel cell fluids from a fluid bus to the fuel cell devices through a fluid manifold located in the equipment rack;

means for adjusting the electrical power generated by each of the fuel cell devices, by individually regulating a flow of the fuel cell fluids through the fluid manifold to each of the fuel cell devices; and means for electrically isolating the internal power bus of each of the fuel cell devices from the external power bus.

* * * * *